United States Patent
Suzuki

(10) Patent No.: US 7,129,663 B2
(45) Date of Patent: Oct. 31, 2006

(54) ELECTRIC POWER STEERING APPARATUS AND BOOSTER

(75) Inventor: Hiroshi Suzuki, Okazaki (JP)

(73) Assignees: Favess Co., Ltd., Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/214,726

(22) Filed: Aug. 31, 2005

(65) Prior Publication Data

US 2006/0055351 A1   Mar. 16, 2006

(30) Foreign Application Priority Data

Sep. 1, 2004   (JP) ............... 2004-254407

(51) Int. Cl.
B62D 5/04 (2006.01)
H02P 27/06 (2006.01)

(52) U.S. Cl. ............ 318/504; 323/282; 363/59; 180/6.44

(58) Field of Classification Search ......... 323/234, 323/247, 282; 363/59–61, 123, 124; 318/504; 180/6.2, 6.28, 6.3, 6.44
See application file for complete search history.

(56) References Cited

U.S. PATENT DOCUMENTS

| | | | | |
|---|---|---|---|---|
| 4,801,859 A | * | 1/1989 | Dishner | 323/224 |
| 5,359,280 A | * | 10/1994 | Canter et al. | 323/282 |
| 5,726,845 A | * | 3/1998 | Ho | 361/86 |
| 5,754,419 A | * | 5/1998 | Ho | 363/89 |
| 5,758,741 A | | 6/1998 | Tomioka | |
| 6,194,880 B1 | * | 2/2001 | Fraidlin et al. | 323/222 |
| 6,331,365 B1 | * | 12/2001 | King | 429/9 |
| 6,819,088 B1 | * | 11/2004 | Shenai et al. | 323/222 |

FOREIGN PATENT DOCUMENTS

| JP | 2003-319679 | 11/2003 |
|---|---|---|
| JP | 2003-319700 | 11/2003 |

* cited by examiner

*Primary Examiner*—Bentsu Ro
(74) *Attorney, Agent, or Firm*—Oblon, Spivak, McClelland, Maier & Neustadt, P.C.

(57) ABSTRACT

An electric power steering apparatus includes a booster circuit and a microcomputer. The booster circuit includes a booster coil, a first FET, and a second FET. The booster coil is connected to the first FET, which is grounded. A node a between the booster coil and the first FET is connected to the second FET, which is connected to a drive circuit. The microcomputer drives the first and second FETs such that the first and second FETs are selectively turned on and off, thereby controlling an output voltage of the booster circuit. When application of assisting force to a steering system is stopped, the microcomputer holds the second FETs on until the output voltage of the booster circuit becomes equal to a predetermined voltage.

6 Claims, 5 Drawing Sheets

ELECTRIC POWER STEERING APPARATUS AND BOOSTER

CROSS-REFERENCE TO RELATED APPLICATIONS

This application is based upon and claims the benefit of priority from prior Japanese Patent Application No. 2004-254407, filed on Sep. 1, 2004, the entire contents of which are incorporated herein by reference.

BACKGROUND OF THE INVENTION

The present invention relates to an electric power steering (EPS) apparatus equipped with a booster that outputs an output voltage obtained by boosting a power supply voltage, and to a booster.

In recent years, EPS apparatuses, which use a motor as a driving source, are widely used as vehicle power steering apparatuses. Some of EPS apparatuses include a booster circuit to boost a supply source voltage. Such an EPS apparatus controls a motor based on a boosted voltage, such that assisting force increases and the rise characteristic of the assisting force is improved.

For example, the EPS apparatus disclosed in Japanese Laid-Open Patent Publication No. 2003-319700 includes a booster circuit provided between a vehicle power supply and a drive circuit. The booster circuit includes a booster coil, a first switching element, and a second switching element. The power supply voltage is applied to one end of the booster coil. The first switching element selectively grounds the other end of the booster coil. The second switching element selectively connects and disconnects the node between the booster coil and the first switching element with an output terminal.

By turning on and off the first and second switching elements, the booster circuit boosts the power supply voltage and then smoothes the pulsating voltage and current with a smoothing capacitor connected to the output terminal. The booster circuit then applies the smoothed voltage and current to the drive circuit When an assist control stops due to turning off of an ignition switch or an abnormality of the EPS apparatus, the output terminal of the booster circuit is disconnected from the motor, which is a load of the booster circuit. Therefore, if the boost control is stopped at the same time as the assist control is stopped, so that the smoothing capacitor is disconnected from the vehicle power supply, the energy stored in the smoothing capacitor is not consumed after the stop of the boost control, and the terminal voltage of the smoothing capacitor is maintained to a high level for an extended period of time. Such high voltage portions are limiting factors in maintenance. In this respect, the booster circuit of the publication has plenty of room for improvement.

SUMMARY OF THE INVENTION

Accordingly, it is an objective of the present invention to provide an electric power steering apparatus and a booster that are capable of quickly lowering the voltage of a terminal of a smoothing capacitor of a booster circuit after an assist control is stopped.

To achieve the foregoing and other objectives and in accordance with the purpose of the present invention, an electric power steering apparatus including a booster circuit, a motor, and a control section is provided. The booster circuit outputs an output voltage. The output voltage is obtained by boosting a power supply voltage. The booster circuit includes a booster coil, a first switching element, an output terminal, a second switching element, and a smoothing capacitor. The booster coil has a first end and a second end. The power supply voltage is applied to the first end of the booster coil. The first switching element is connected to the second end of the booster coil. The first switching element selectively causes the second end to be grounded and ungrounded. The output terminal is connected to a node between the second end of the booster coil and the first switching element. The second switching element is provided between the node and the output terminal. The second switching element selectively connects and disconnects the node with the output terminal. The smoothing capacitor is connected to the output terminal. The motor is controlled according to power that is supplied based on the output voltage of the booster circuit. The electric power steering apparatus uses the motor as a driving source to apply assisting force to a steering system. The control section drives the first and second switching elements such that the first and second switching elements are selectively turned on and off, thereby controlling the output voltage of the booster circuit. When application of assisting force to the steering system is stopped, the control section holds the second switching element on until the output voltage of the booster circuit becomes equal to a predetermined voltage.

Also, an electric power steering apparatus including a booster circuit, a motor, and a control section is provided. The booster circuit outputs an output voltage. The output voltage is obtained by boosting a power supply voltage. The booster circuit includes a booster coil, a first switching element, an output terminal, a second switching element, and a smoothing capacitor. The booster coil has a first end and a second end. The power supply voltage is applied to the first end of the booster coil. The first switching element is connected to the second end of the booster coil. The first switching element selectively causes the second end to be grounded and ungrounded. The output terminal is connected to a node between the second end of the booster coil and the first switching element. The second switching element is provided between the node and the output terminal. The second switching element selectively connects and disconnects the node with the output terminal. The smoothing capacitor is connected to the output terminal. The motor is controlled according to power that is supplied based on the output voltage of the booster circuit. The electric power steering apparatus uses the motor as a driving source to apply assisting force to a steering system. The control section drives the first and second switching elements such that the first and second switching elements are selectively turned on and off, thereby controlling the output voltage of the booster circuit. When application of assisting force to the steering system is stopped, the control section holds the second switching element on until a predetermined time has elapsed from when the application of the assisting force is stopped.

The present invention provides another electric power steering apparatus including a booster circuit, a motor, and a control section. The booster circuit outputs an output voltage. The output voltage is obtained by boosting a power supply voltage. The motor is controlled according to power that is supplied based on the output voltage of the booster circuit. The electric power steering apparatus uses the motor as a driving source to apply assisting force to a steering system. The control section controls the output voltage of the booster circuit through a feedback control based on a deviation of the output voltage from a target voltage. When application of assisting force to the steering system is stopped, the control section corrects the target voltage such that the target voltage is gradually lowered as time elapses from when the application of the assisting force is stopped.

In another aspect of the present invention a booster including a booster circuit and a control section is provided. The booster circuit outputs an output voltage. The output voltage is obtained by boosting a power supply voltage. The booster circuit includes a booster coil, a first switching element, an output terminal, a second switching element, and a smoothing capacitor. The booster coil has a first end and a second end. The power supply voltage is applied to the first end of the booster coil. The first switching element is connected to the second end of the booster coil. The first switching element selectively causes the second end to be grounded and ungrounded. The output terminal is connected to a node between the second end of the booster coil and the first switching element. The second switching element is provided between the node and the output terminal. The second switching element selectively connects and disconnects the node with the output terminal. The smoothing capacitor is connected to the output terminal. The control section drives the first and second switching elements such that the first and second switching elements are selectively turned on and off, thereby controlling the output voltage of the booster circuit. When the booster circuit stops boosting the power supply voltage, the control section holds the second switching element on until the output voltage of the booster circuit becomes equal to a predetermined voltage.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

One embodiment of the present invention will now be described with reference to FIGS. 1 to 5.

Figure 1:
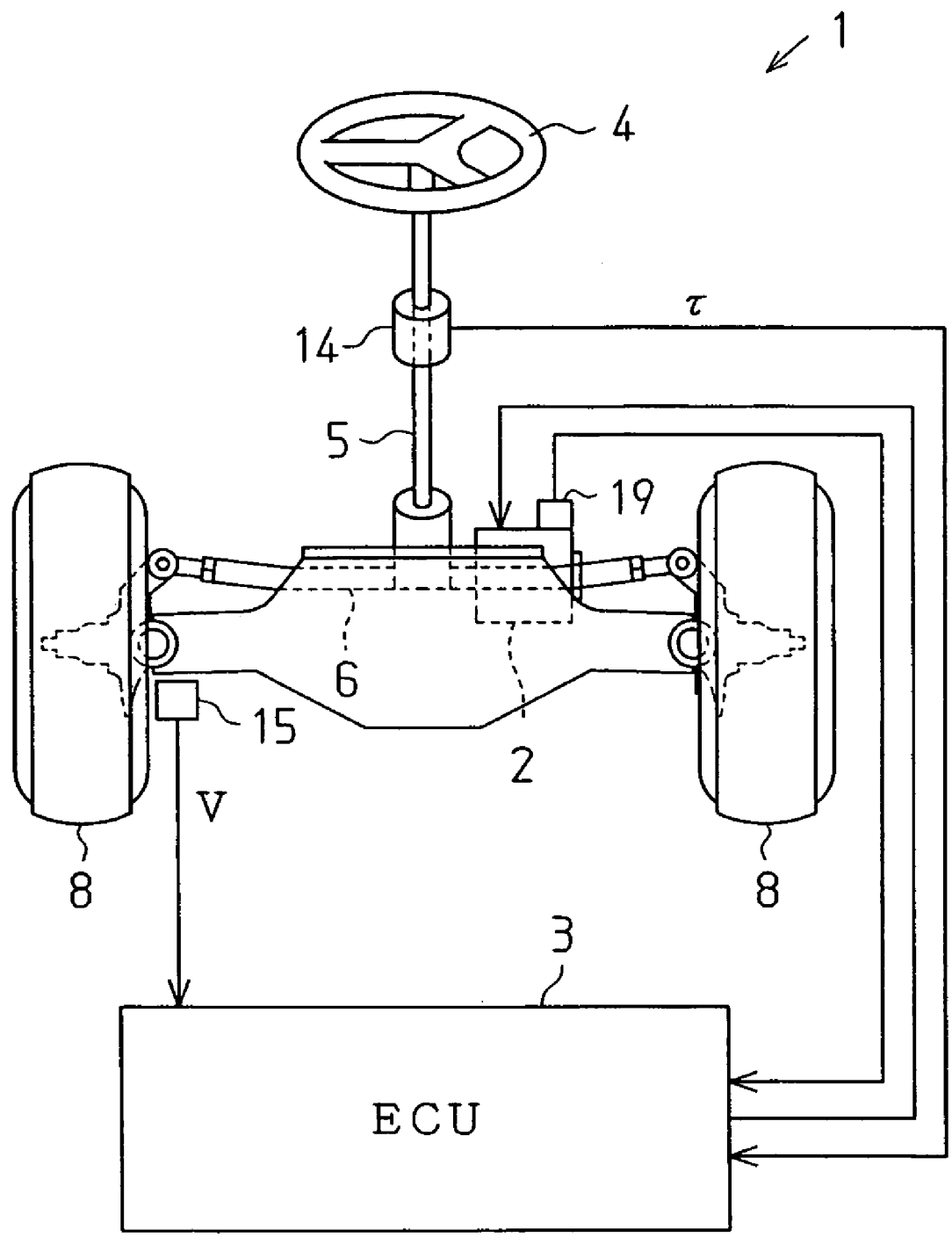
FIG. 1 is a diagrammatic view illustrating an electric power steering (EPS) apparatus according to one embodiment of the present invention.

As shown in FIG. 1, an electric power steering (EPS) apparatus 1 according to this embodiment includes a motor 2, which functions as a driving source for applying assisting force to the steering system of a vehicle, and an ECU 3 for controlling the motor 2.

A steering wheel 4 is coupled to a rack 6 with a steering shaft 5. Rotation of the steering shaft 5 caused by steering operation is converted into linear reciprocation of the rack 6 by means of a rack-and-pinion mechanism (not shown) and is transmitted to steered wheels 8. The EPS apparatus 1 of this embodiment is a rack type EPS apparatus, in which the motor 2 is arranged coaxial with the rack 6. Assisting torque generated by the motor 2 is transmitted to the rack 6 through a ball screw mechanism (not shown). The ECU 3 controls assisting force applied to the steering system by controlling the assisting torque generated by the motor 2.

Figure 2:
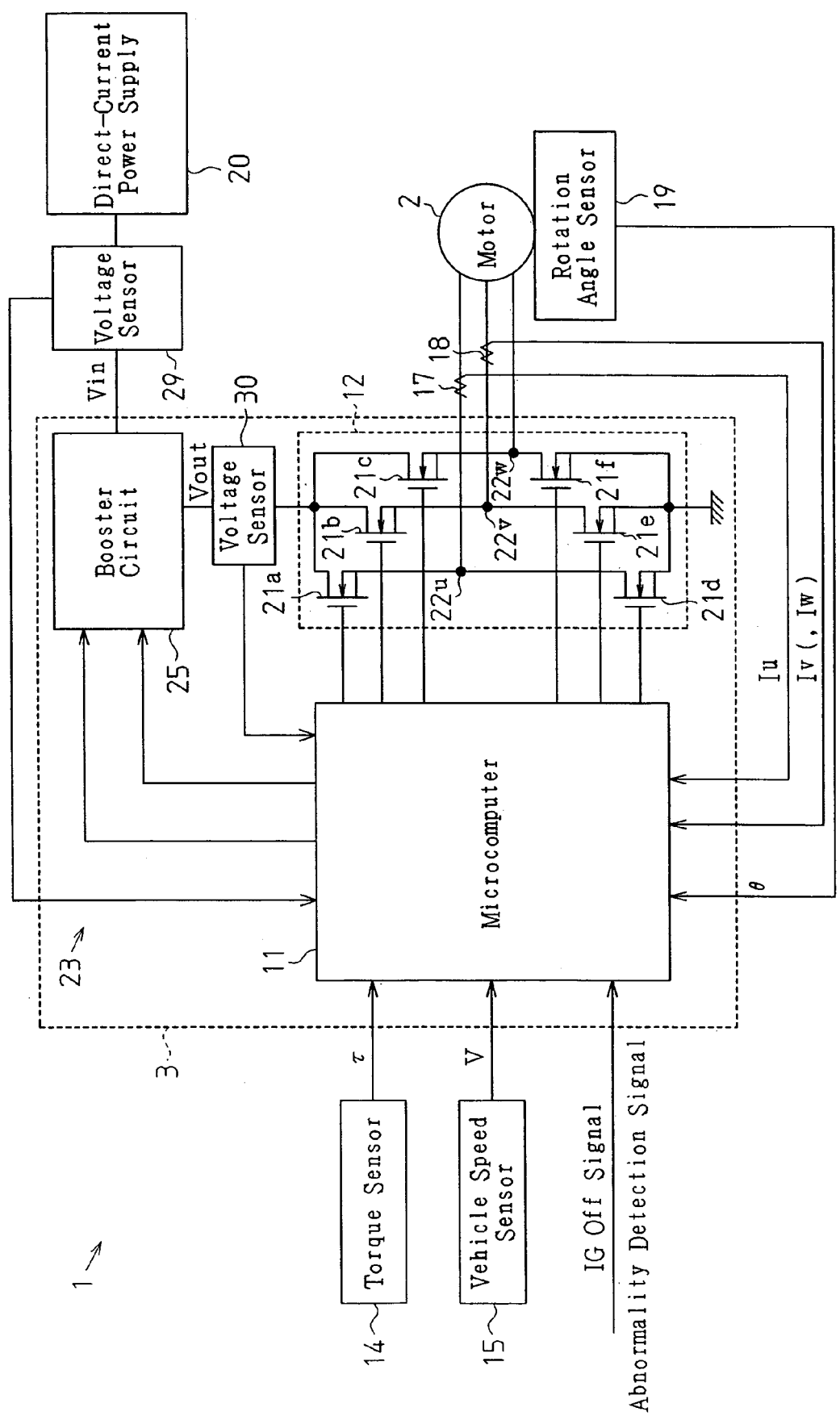
FIG. 2 is a block diagram illustrating the electrical configuration of the EPS apparatus shown in FIG. 1.

As shown in FIG. 2, the ECU 3 has a microcomputer 11 that outputs a motor regulation signal, and a drive circuit 12 that supplies power to the motor 2 based on the motor regulation signal. The motor 2 of the present embodiment is a brushless motor. The drive circuit 12 supplies power of three phases (U, V, W) to the motor 2 based on the motor regulation signal.

The microcomputer 11 is connected to a torque sensor 14 for detecting steering torque τ and a vehicle speed sensor 15 (see FIG. 1). Based on the inputted steering torque τ and the vehicle speed V, the microcomputer 11 determines assisting force to be applied to the steering system, that is, assisting torque to be generated by the motor 2.

The microcomputer 11 is also connected to current sensors 17, 18 for detecting values of current supplied to the motor 2, and rotation angle sensor 19 for detecting the rotation angle (electrical angle) θ of the motor 2. Based on the output signals of these sensors, the microcomputer 11 detects phase current values Iu, Iv, Iw, and the rotation angle θ of the motor 2. Based on the detected phase current values Iu, Iv, Iw and the rotation angle θ, the microcomputer 11 outputs a motor regulation signal for causing the motor 2 to generate the determined assisting torque.

In this embodiment, the microcomputer 11 subjects the phase current values Iu, Iv, Iw to d/q conversion for controlling currents on a d/q coordinate system. Specifically, the microcomputer 11 controls a q-axis current value to follow a q-axis current command value that is a target value of the assisting torque. Then, the microcomputer 11 sends the motor regulation signal, which has been determined based on the current control in the d/q coordinate system, to the drive circuit 12.

The drive circuit 12 includes power MOSFETs (hereinafter, simply referred to as FET), the number of which corresponds to the number of phases of the motor 2 (2×3) More specifically, the drive circuit 12 includes a series circuit of FETs 21a, 21d, a series circuit of FET 21b, 21e, and a series circuit FETs 21c, 21f, which are connected to one another in parallel. A node 22u of the FETs 21a, 21d is connected to a U phase coil of the motor 2, a node 22v of the FETs 21b, 21e is connected to a V phase coil of the motor 2, and a node 22w of the FETs 21c, 21f is connected to a W phase coil of the motor 2.

Motor regulation signals outputted by the microcomputer 11 are applied to the gate terminals of the FETs 21a to 21f. In response to the motor regulation signal, the FETs 21a to 21f are turned on and off so that direct-current voltage supplied by a direct-current power supply 20 is converted into power of three phases (U, V, W), which is then supplied to the motor 2.

The apparatus 1 includes the booster 23. In this embodiment, the booster 23 is configured of a booster circuit 25 and a control section, which is the microcomputer 11. The booster circuit 25 is provided in a power supplying path between the direct-current power supply 20 and the drive circuit 12. The booster circuit 25 is controlled by the microcomputer 11 and boosts power supply voltage Vin of the direct-current power supply 20 and sends output voltage Vout to the drive circuit 12.

Figure 3:
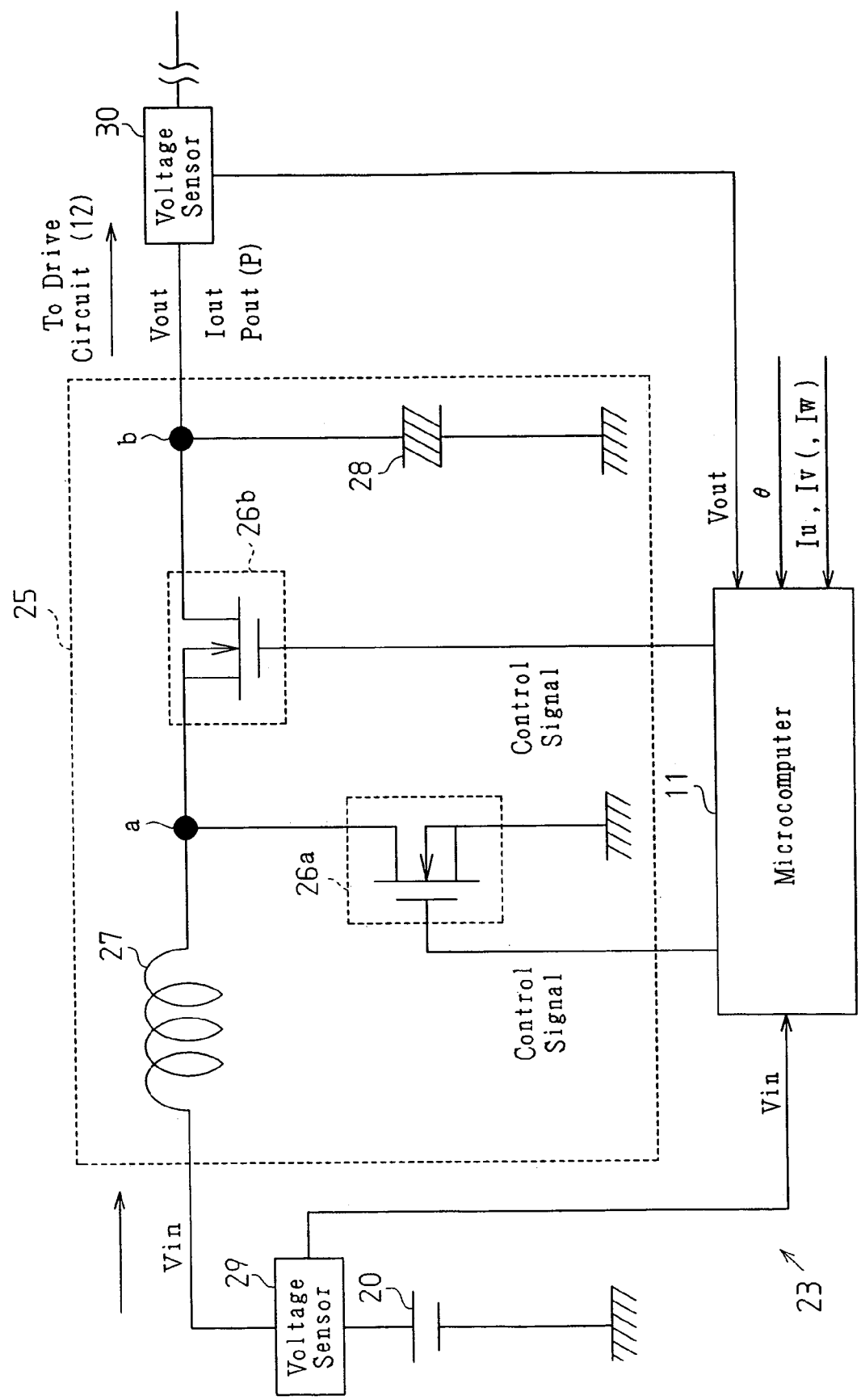
FIG. 3 is a block diagram showing the configuration of the booster of the electric power steering apparatus shown in FIG. 1.
Figure 4:
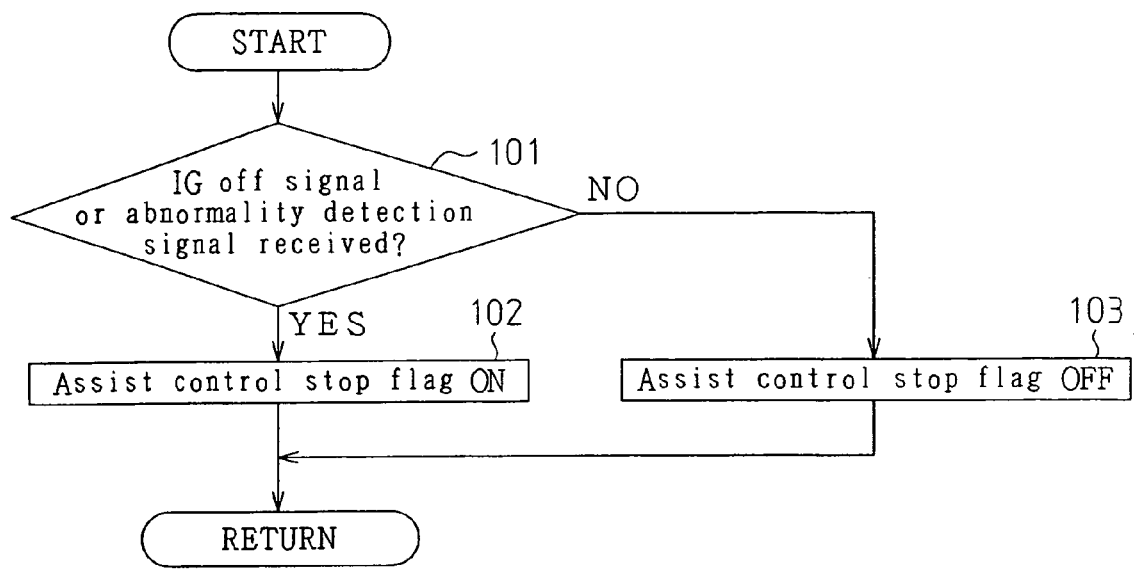
FIG. 4 is a flowchart showing a procedure for determining whether to stop an assist control.

As shown in FIG. 3, the booster circuit 25 includes a first FET 26a, a second FET 26b, a booster coil 27, and a smoothing capacitor 28. One end of the booster coil 27 is connected to the direct-current power supply 20, and the other end is connected to a drain terminal of the first FET 26a. A source terminal of the first FET 26a is grounded. A node a between the booster coil 27 and the first FET 26a is connected to a source terminal of the second FET 26b. A drain terminal of the second FET 26b is connected to the drive circuit 12. A node b between the second FET 26b and the drive circuit 12 is grounded via the smoothing capacitor 28.

That is, in this embodiment, the first FET 26a functions as a first switching element that selectively causes the booster coil 27 to be grounded and ungrounded, and the node b functions as an output terminal of the booster circuit 25. The second FET 26b functions as a second switching element that selectively connects and disconnects the node between the booster coil 27 and the first switching element with the output terminal.

The gate terminals of the first FET 26a and the second FET 26b are connected to the microcomputer 11. The microcomputer 11 sends control signals to the gate terminals of the first FET 26a and the second FET 26b, thereby turning on an off the first FET 26a and the second FET 26b. That is, the microcomputer 11 drives the first FET 26a and the second FET 26b such that the first FET 26a and the second FET 26b are selectively switched between an on state and an off state. Accordingly, when the first FET 26a is turned off, the voltage at the node a becomes equal to a voltage obtained by superimposing the counter electromotive force generated in the booster coil 27 onto the power supply voltage Vin. When the first FET 26a is turned on, the voltage at the node a becomes the grounded voltage. The voltage at the node a is transmitted to the node b when the second FET 26b is on. The pulsating voltage and current at the node b are smoothed by the smoothing capacitor 28, so that the output voltage Vout, which is obtained by boosting the power supply voltage Vin of the direct-current power supply 20, is outputted from the booster circuit 25.

In this embodiment, the microcomputer 11 sends, as control signals, pulse signals having a predetermined duty ratio to the first FET 26a and the second FET 26b. That is, the microcomputer 11 performs a PWM control of the first and second FETs 26a, 26b, thereby controlling the output voltage Vout of the booster circuit 25. The control of the output voltage Vout will hereafter be referred to as boost control.

More specifically, the microcomputer 11 is connected to a first voltage sensor 29 for detecting the power supply voltage Vin of the direct-current power supply 20 and a second voltage sensor 30 for detecting the output voltage Vout of the booster circuit 25. Based on the deviation of the output voltage Vout detected by the second voltage sensor 30 from a target voltage, which is a control target, the microcomputer 11 performs feedback control computation of the output voltage Vout. The microcomputer 11 then sends control signals having the duty ratio that has been determined in the feedback control computation to the first and second FETs 26a, 26b. In response to the control signal, the on/off time of each of the first and second FETs 26a, 26b is changed. The output voltage Vout of the booster circuit 25 is thus controlled.

The output voltage Vout of the booster circuit 25 is set to a higher value when the duty ratio of the control signal (ON duty ratio of the control signal sent to the first FET 26a) is great. The output voltage Vout is set to a lower value when the duty ratio is small. In this embodiment, the microcomputer 11 uses a predetermined voltage V1 as the target voltage for controlling the output voltage Vout of the booster circuit 25.

[Boost Control After Stopping Assist Control]

Next, the boost control after the assist control is stopped will be described.

As shown in FIG. 2, the microcomputer 11 receives an IG off signal indicating that the ignition switch is turned off, and an abnormality detection signal indicating that there is an abnormality in the EPS apparatus 1 including the motor 2. When receiving the IG off signal or the abnormality detection signal, the microcomputer 11 stops outputting the motor regulation signal for supplying the power to the motor 2, that is, stops the assist control for applying assisting force to the steering system.

In this embodiment, the microcomputer 11 continues to control the output voltage Vout after stopping the assist control. To quickly lower the terminal voltage of the smoothing capacitor 28 of the booster circuit 25, the microcomputer 11 performs on/off control of the first FET 26a and the second FET 26b of the booster circuit 25.

More specifically, after stopping the assist control, the microcomputer 11 turns off the first FET 26a (fixes the ON duty ratio of the control signal sent to the first FET 26a to zero), thereby stopping boosting the power supply voltage Vin. Then, until the output voltage Vout of the booster circuit 25 drops to the predetermined voltage V1, the microcomputer 11 turns on the second FET 26b (fixes the ON duty ratio of the control signal sent to the second FET 26b to 100). In this embodiment, the predetermined voltage V1 is set to a value equivalent to the power supply voltage Vin, which does not hider maintenance.

Procedures of the assist control stop determination and the boost control performed by the microcomputer 11 of this embodiment will now be described.

In this embodiment, the microcomputer 11 performs the assist control stop determination and the boost control in an interrupting manner at every predetermined interval. In the assist control stop determination shown in FIG. 4, the microcomputer 11 first determines whether it has received the IG off signal or the abnormality detection signal, thereby determining whether to stop the assist control (step 101). If the IG off signal or the abnormality detection signal has been received (step 101: YES), the microcomputer 11 stops the assist control, and sets an assist control stop flag to ON (step 102). If the IG off signal or the abnormality detection signal has not been received (step 101: NO), the microcomputer 11 does not stop the assist control, and sets the assist control stop flag to OFF (step 103).

Figure 5:
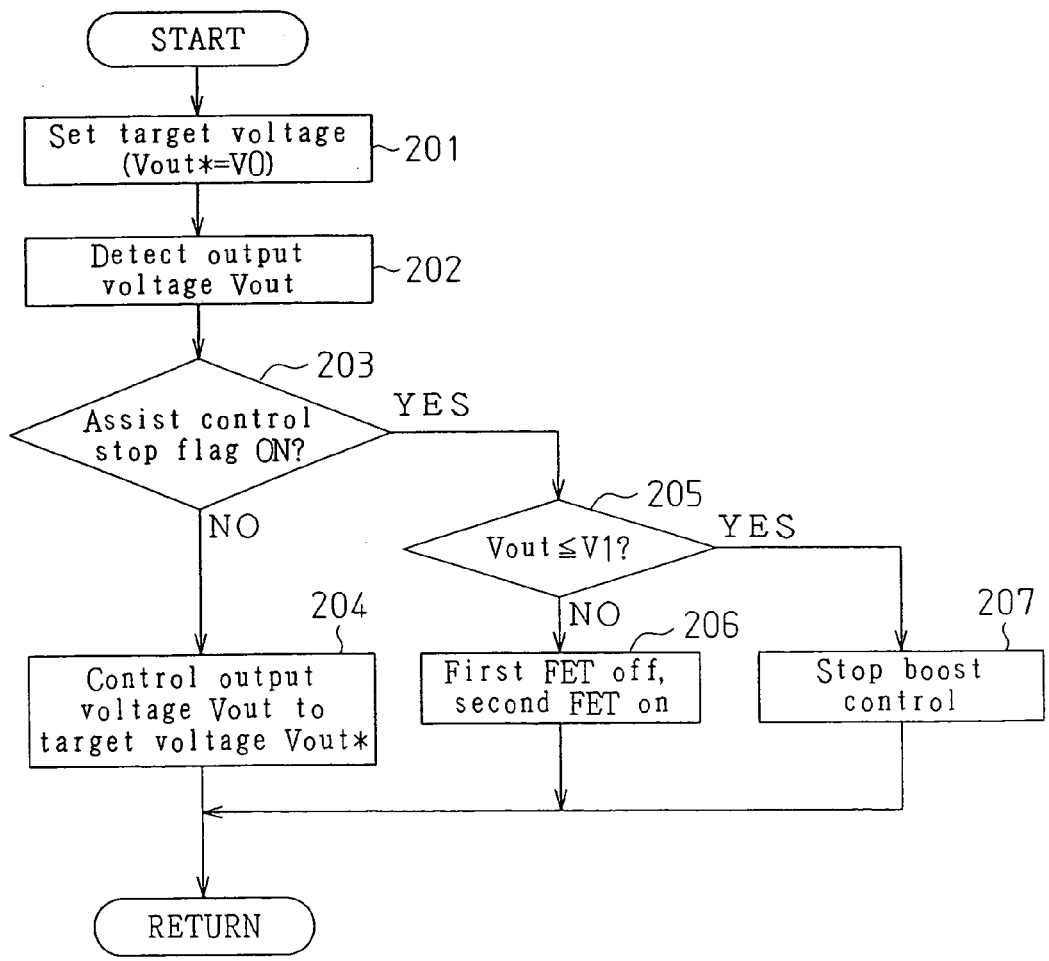
FIG. 5 is a flowchart showing a procedure of a boost control performed after the assist control is stopped.

In the boost control shown in FIG. 5, the microcomputer 11 first sets a target voltage Vout* to a predetermined voltage V0 (step 201), and detects the output voltage Vout (step 202). Subsequently, the microcomputer 11 determines whether the assist control stop flag is ON (step 203). If the assist control stop flag is not ON (step 203: NO), the microcomputer 11 performs a feedback control computation, thereby outputting control signals to cause the output voltage Vout to seek the target voltage Vout* (step 204).

On the other hand, when determining that the assist control stop flag is ON at step 203 (step 203: YES), the microcomputer 11 determines whether the output voltage Vout is less than or equal to the predetermined voltage V1 (step 205). When the output voltage Vout is greater than the predetermined voltage V1 (step 205: NO), the microcomputer 11 turns off the first FET 26a, and turns on the second FET 26b (step 206). When determining that the output voltage Vout is less than or equal to the predetermined voltage V1 at step 205 (step 205: YES), the microcomputer 11 stops sending the control signal to the booster circuit 25, that is, stops the boost control (step 207).

In this manner, the microcomputer 11 performs the assist control stop determination and the boost control in an interrupting manner at every predetermined interval, thereby holding the second FET 26b (step 206) on until the output voltage Vout becomes less than or equal to the predetermined voltage V1 after the assist control is stopped (that is, after the assist control stop flag is turned ON).

When the second FET 26b is turned on, the booster coil 27 and the smoothing capacitor 28 are connected to each other. As a result, the accumulated energy (electric charge) in the smoothing capacitor 28 is returned to the direct-current power supply 20 via the booster coil 27. Therefore, the terminal voltage of the smoothing capacitor 28 is quickly lowered to a level that does not hinder maintenance.

The preferred embodiment may be modified as follows.

Instead of fixing the second FET 26b in the on state after stopping the assist control, the second FET 26b may be intermittently turned on until the output voltage Vout becomes equal to the predetermined voltage V1. In this case, after the assist control is stopped, the ON duty ratio of the control signal sent to the second FET 26b may be arbitrarily set.

After stopping the assist control, the microcomputer 11 holds the second FET 26b on until the output voltage Vout becomes equal to the predetermined voltage V1 in the illustrated embodiment. However, the microcomputer 11 may hold the second FET 26b on until a predetermined period elapses from the stop of the assist control. This configuration also quickly lowers the terminal voltage of the smoothing capacitor of the booster circuit after the assist control is stopped.

Figure 6:
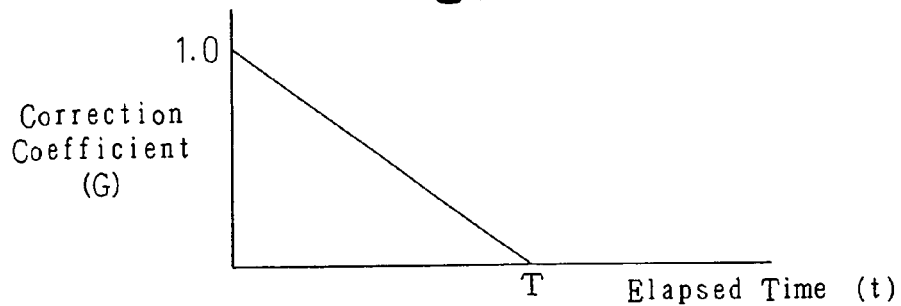
FIG. 6 is a graph showing the relationship between a correction coefficient and elapsed time.

Instead of fixing the second FET 26b in the on state after the assist control is stopped, the target voltage of the feedback control computation may be corrected to gradually decrease as time elapses from the stop of the assist control. For example, the target voltage Vout* may be corrected by multiplying the target voltage Vout* by a correction coefficient G (see FIG. 6) that decreases as time elapses from the stop of the assist control, and the feedback control computation may be performed based on a corrected target voltage Vout**.

Figure 7:
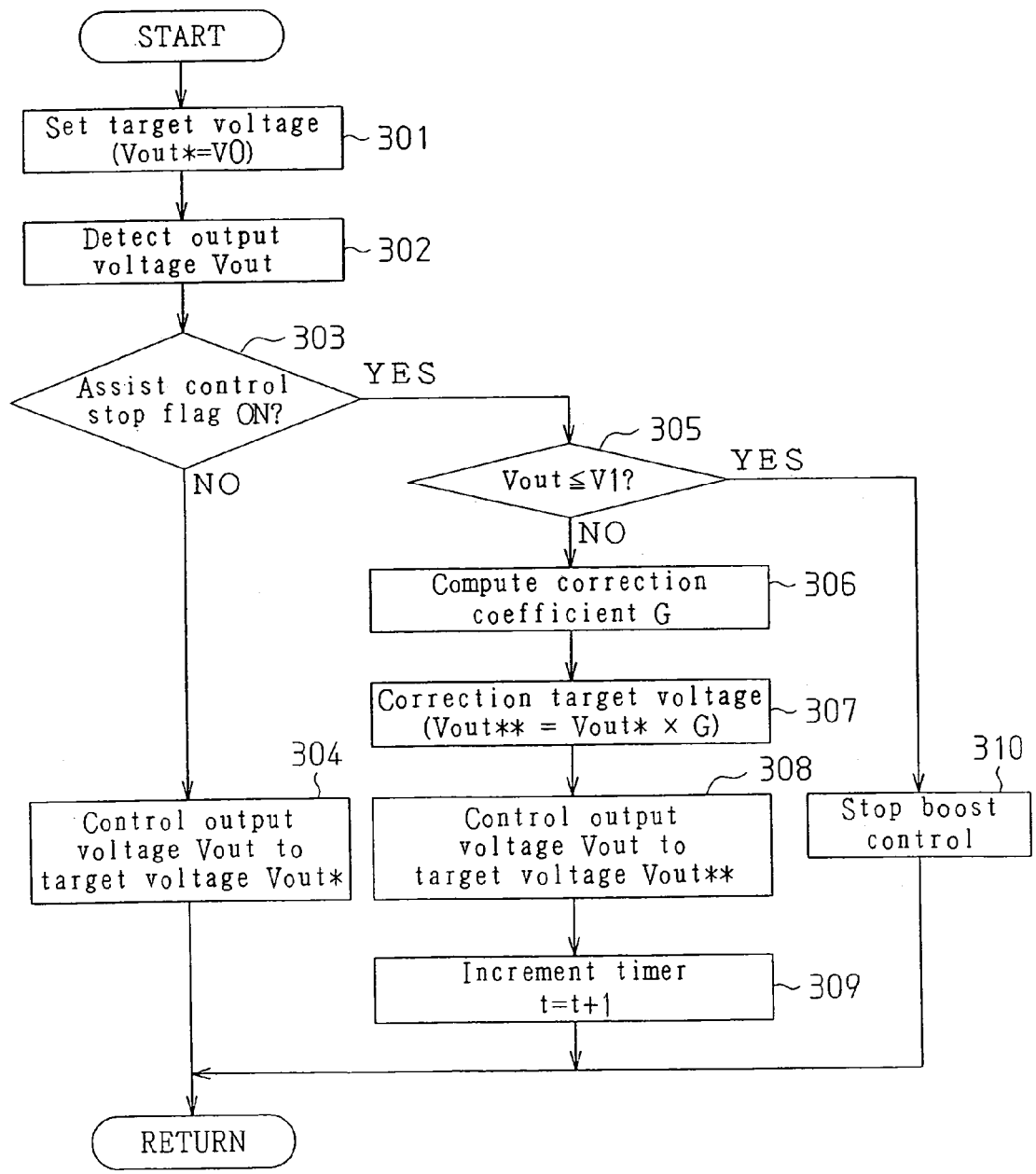
FIG. 7 is a flowchart showing a procedure of boost control according to a modified embodiment.

In this modification, which is shown in the flowchart of FIG. 7, if the microcomputer 11 determines that the assist control stop flag is ON (step 303: YES), the microcomputer 11 proceeds to step 305. When determining that the output voltage Vout is greater than the predetermined voltage V1 (step 305: NO), the microcomputer 11 determines the correction coefficient G based on the elapsed time t from the stop of the assist control (step 306). Then, based on the correction coefficient G, the microcomputer 11 corrects the target voltage Vout* (Vout**=Vout*×G, step 307), and outputs the control signal such that the output voltage Vout seeks the corrected target voltage Vout (step 308). Then, the microcomputer 11 increments a timer for measuring the elapsed time t from the stop of the assist control by 1 (step 309). The timer for measuring the elapsed time t from the stop of the assist control is cleared to zero when the assist control stop flag is set on in the assist control stop determination shown in FIG. 4**.

When determining that the output voltage Vout is less than or equal to the predetermined voltage V1 at step 305 (step 305: YES), the microcomputer 11 stops sending the control signal to the booster circuit 25, that is, stops the boost control (step 310).

In this manner, after the assist control is stopped (step 303: YES), every time steps 306 to 309 are performed in an interrupting manner at every predetermined interval, the correction coefficient G, which is determined at step 306, is decreased as the elapsed time t increases. Accordingly, the corrected target voltage Vout, which is computed at step 307, is lowered as the elapsed time t increases. By controlling the output voltage Vout to seek the corrected target voltage Vout, the terminal voltage of the smoothing capacitor of the booster circuit is quickly lowered.

Therefore, this modification obtains the same advantages as the illustrated embodiment. The modification is advantageous in that the performance is not affected by the configuration of the booster circuit. Since steps 301 to 304 of the flowchart shown in FIG. 7 is equivalent to steps 201 to 204 of the flowchart shown in FIG. 5, the explanations thereof are omitted.

The correction coefficient G and the corrected target voltage Vout do not need to be determined by the method of the flowchart shown in FIG. 7, but may be determined by any method as long as the coefficient G and the voltage Vout decrease as time elapses from the stop of the assist control.

The invention claimed is:

1. An electric power steering apparatus, comprising:
a booster circuit outputting an output voltage, the output voltage being obtained by boosting a power supply voltage, the booster circuit comprising: a booster coil having a first end and a second end, the power supply voltage being applied to the first end of the booster coil; a first switching element connected to the second end of the booster coil, the first switching element selectively causing the second end to be grounded and ungrounded; an output terminal connected to a node between the second end of the booster coil and the first switching element; a second switching element provided between the node and the output terminal, the second switching element selectively connects and disconnects the node with the output terminal; and a smoothing capacitor connected to the output terminal;
a motor being controlled according to power that is supplied based on the output voltage of the booster circuit, wherein the electric power steering apparatus uses the motor as a driving source to apply assisting force to a steering system; and
a control section that drives the first and second switching elements such that the first and second switching elements are selectively turned on and off during application of assisting force to the steering system, thereby controlling the output voltage of the booster circuit, wherein, when application of assisting force to the steering system is stopped, the control section holds the second switching element on until the output voltage of the booster circuit becomes equal to a predetermined voltage.

2. The electric power steering apparatus according to claim 1, wherein the predetermined voltage is equivalent to the power supply voltage.

3. The electric power steering apparatus according to claim 1, wherein the control section selectively turns the second switching element on and off through a PWM control.

4. An electric power steering apparatus, comprising:

a booster circuit outputting an output voltage, the output voltage being obtained by boosting a power supply voltage, the booster circuit comprising: a booster coil having a first end and a second end, the power supply voltage being applied to the first end of the booster coil; a first switching element connected to the second end of the booster coil, the first switching element selectively causing the second end to be grounded and ungrounded; an output terminal connected to a node between the second end of the booster coil and the first switching element; a second switching element provided between the node and the output terminal, the second switching element selectively connects and disconnects the node with the output terminal; and a smoothing capacitor connected to the output terminal;

a motor being controlled according to power that is supplied based on the output voltage of the booster circuit, wherein the electric power steering apparatus uses the motor as a driving source to apply assisting force to a steering system; and a control section that drives the first and second switching elements such that the first and second switching elements are selectively turned on and off during application of assisting force to the steering system, thereby controlling the output voltage of the booster circuit, wherein, when application of assisting force to the steering system is stopped, the control section holds the second switching element on until a predetermined time has elapsed from when the application of the assisting force is stopped.

5. The electric power steering apparatus according to claim 4, wherein the control section selectively turns the second switching element on and off through a PWM control.

6. An electric power steering apparatus, comprising:

a booster circuit outputting an output voltage, the output voltage being obtained by boosting a power supply voltage; and a motor being controlled according to power that is supplied based on the output voltage of the booster circuit, wherein the electric power steering apparatus uses the motor as a driving source to apply assisting force to a steering system; and a control section that controls the output voltage of the booster circuit through a feedback control based on a deviation of the output voltage from a target voltage, wherein, when application of assisting force to the steering system is stopped, the control section corrects the target voltage such that the target voltage is gradually lowered as time elapses from when the application of the assisting force is stopped.

* * * * *